US008478919B2

(12) United States Patent
De Troch et al.

(10) Patent No.: US 8,478,919 B2
(45) Date of Patent: Jul. 2, 2013

(54) METHOD AND SYSTEM FOR CONTROLLING THE ADMISSION OF A STORAGE MEANS TO A PERIPHERAL BUS OF A DATA REPRODUCTION SYSTEM

(75) Inventors: Stefan De Troch, Zichem (BE); Karl Verheyden, Tielt-Winge (BE)

(73) Assignee: NXP B.V., Eindhoven (NL)

( * ) Notice: Subject to any disclaimer, the term of this patent is extended or adjusted under 35 U.S.C. 154(b) by 98 days.

(21) Appl. No.: 12/681,965

(22) PCT Filed: Oct. 8, 2008

(86) PCT No.: PCT/IB2008/054118
§ 371 (c)(1),
(2), (4) Date: Apr. 7, 2010

(87) PCT Pub. No.: WO2009/047713
PCT Pub. Date: Apr. 16, 2009

(65) Prior Publication Data
US 2010/0228897 A1    Sep. 9, 2010

(30) Foreign Application Priority Data
Oct. 11, 2007    (EP) .................................... 07118278

(51) Int. Cl.
G06F 3/00    (2006.01)
G06F 5/00    (2006.01)
G06F 13/00    (2006.01)

(52) U.S. Cl.
USPC .................. 710/107; 710/30; 710/52; 710/36

(58) Field of Classification Search
USPC ........................ 710/52, 30, 36, 107
See application file for complete search history.

(56) References Cited

U.S. PATENT DOCUMENTS

| 5,157,666 | A  | * | 10/1992 | Chen et al. .................... 714/718 |
| 5,890,014 | A  | * | 3/1999  | Long ................................. 710/8 |
| 6,256,059 | B1 | * | 7/2001  | Fichtner .................... 348/222.1 |
| 6,295,516 | B1 |   | 9/2001  | Takeyasu |
| 6,415,337 | B1 | * | 7/2002  | Chung ........................... 710/16 |
| 6,658,512 | B1 |   | 12/2003 | Gokulrangan |

(Continued)

FOREIGN PATENT DOCUMENTS
EP    1 638 257 A1    3/2006

OTHER PUBLICATIONS

International Search Report and Written Opinion for Int'l. Patent Appln. No. PCT/IB2008/054113 (Mar. 27, 2009), with Notification of Transmittal . . . (PCT/ISA/220).

*Primary Examiner* — Farley Abad

(57) ABSTRACT

It is an object of the invention to ensure the reliable and flawless operation of a storage means that is connected to a data reproduction system. This object will be met by a method for controlling the admission of a storage means to a peripheral bus of a data reproduction system, wherein a storage means is connected to the peripheral bus of a data reproduction system, the read latency of the storage means is determined, and it is decided based on the determined read latency whether the storage means is admitted to the peripheral bus or rejected. The latency for read requests from the storage means, for instance a USB mass storage device, will be analyzed on first insertion and the results of this analysis will be used to carry out a compatibility check of the storage means with the data reproduction system, for example a car audio system.

18 Claims, 2 Drawing Sheets

U.S. PATENT DOCUMENTS

| | | |
|---|---|---|
| 7,139,937 B1* | 11/2006 | Kilbourne et al. ............ 714/47.2 |
| 2001/0022754 A1 | 9/2001 | Pawlowski |
| 2002/0105951 A1* | 8/2002 | Hannuksela et al. ......... 370/389 |
| 2002/0133666 A1* | 9/2002 | Janzen et al. ................. 711/105 |
| 2002/0143921 A1* | 10/2002 | Stephan ........................ 709/223 |
| 2002/0174273 A1* | 11/2002 | Castellano ..................... 710/29 |
| 2006/0062541 A1* | 3/2006 | Borden ........................... 386/46 |
| 2006/0095619 A1* | 5/2006 | Martinez et al. ................ 710/72 |
| 2006/0179193 A1* | 8/2006 | Miura ........................... 710/110 |
| 2007/0156991 A1 | 7/2007 | Gould et al. |
| 2009/0055195 A1* | 2/2009 | Karlsgodt ..................... 704/500 |

* cited by examiner

METHOD AND SYSTEM FOR CONTROLLING THE ADMISSION OF A STORAGE MEANS TO A PERIPHERAL BUS OF A DATA REPRODUCTION SYSTEM

FIELD OF INVENTION

The invention relates to a method and a system for reliably controlling the admission of a storage means to a peripheral bus of a data reproduction system.

BACKGROUND OF THE INVENTION

There is a big variety of different storage devices that is offered in the market today. In particular, there is a high degree of diversity in the field of portable and semi-portable storage devices. A few examples of such devices are hard disc drives, flash memory devices, memory card reader/drive devices, optical disc (drives), etc. It is desirable that these devices work flawlessly with as many different data processing systems as possible so that the user is flexible in terms of the utilisation of the storage devices.

Many of these storage devices use a universal serial bus to interface with other devices and data processing systems respectively. The advantage of using a universal serial bus is its high level of standardisation and proliferation in today's market. However, some storage devices use other interfaces, for example SD-card-devices. Because of the multitude of different storage devices and connection means, there is a large difference in characteristics between the storage devices that exist today. For example, one of the main problems for car manufacturers is to assure a reliable operation of portable and semi-portable storage devices with the data reproduction system or data processing system of a car. These systems comprise, for instance, car audio systems, navigation systems, and the like. Because in the past car data reproduction systems have shown many interoperability issues with storage devices, car manufactures were reluctant to add USB-connectivity or the like to cars. As a result, many data reproduction systems of cars do not allow for the addition of external storage devices.

Methods and devices known from the prior art that have tried to address this issue have exclusively concentrated on controlling the transmission bandwidth required for the transmission of data from the storage device to the data reproduction system. Examples for such methods and systems are disclosed in U.S. Pat. No. 6,295,516 B1, EP 1 638 257 A1 and U.S. Pat. No. 6,658,512 B1.

However, testing on part of the applicant has shown that the storage devices still do not always reliably work with data reproduction systems, even if the bandwidth requirements are met. Especially with audio systems for cars testing has shown that audio playback didn't always reliably work with USB-storage devices, even if the bandwidth was sufficient. The reason for this is that the characteristics of USB-devices vary in a very wide range depending on the use they are optimized for.

OBJECT AND SUMMARY OF THE INVENTION

It is an object of the invention to ensure the reliable and flawless operation of a storage means that is connected to a data reproduction system.

The above mentioned problems will be solved by a method for controlling the admission of a storage means to a peripheral bus of a data reproduction system, wherein a storage means is connected to the peripheral bus of a data reproduction system, the read latency of the storage means is determined, and it is decided based on the determined read latency whether the storage means is admitted to the peripheral bus or rejected.

Testing on part of the applicant has shown that storage devices optimized for high-throughput transfers can have very large read latencies (exceeding one minute) for low-throughput reads, resulting in delays in the reproduction or the replay of the data. The read latency is the time gap between the processor placing its request for data on the front side bus and the requested data arriving back on the front side bus. This is due to the fact that it takes a certain amount of time for the CPU's request for data to reach the storage means. Furthermore, it also takes a certain amount of time for the storage means to fulfil the request, and a certain amount of time for the requested data to arrive back at the CPU. All of these delays taken together constitute the storage means' read latency.

In light of the above, the essential feature of the method according to the invention is that the latency for read requests from the storage means, for instance a USB mass storage device, will be analyzed on first insertion and the results of this analysis will be used to carry out a compatibility check of the storage means with the data reproduction system, for example a car audio system. If it is found that the determined read latency is within a predetermined limit, then the storage means will be admitted to the peripheral bus. If the determined read latency on the other hand is outside the predetermined range, it cannot be ensured that the storage means will work flawlessly with the data reproduction system and hence it will be rejected. This ensures that the data reproduction experience for the user is completely reliable; the storage means will either work flawlessly or will be refused.

To ensure a reliable data reproduction the read latency is more important than the bandwidth, as the bandwidth over USB, for example, is usually much higher than needed in most application circumstances, for example reading a compressed audio file in real time. This is illustrated by the following example: Assuming that a channel can do 12000 kilobit per second and the bandwidth needed for compressed audio is 128 kilobit per second, so there is no problem from a bandwidth perspective. When the audio system has an internal buffer of 128 kilobit, there will still be a problem when the data arrives in burst of 256 kilobit every two seconds because the internal buffer cannot store all data (although the average bandwidth is still 128 kilobit per second which is sufficient). If each request has a latency of two seconds, re-requesting the missed data is not possible in time because only enough data for one second of playback is buffered.

So, the main characteristic is the latency between a read request and data coming in. To measure this it is preferred that in audio systems data is read with the same size as during actual audio decoding and with the same temporal spacing as during normal playback because the read latency can be dependent on the read access size and/or temporal spacing. The size and time between reads depends on the implementation of the compressed audio playback system. A typical example would be reads of 40 Kilobyte (320 kilobit). The time between the reads should be varied to get the minimal and maximal supported bitrates. In case the minimal bitrate is 32 kilobit per second, the time is 10 seconds (32 kilobit/320 kilobit per second). In case the maximal bitrate is 320 kilobit per second, the time between reads is 1 second.

In general, the data reproduction system can wait to reproduce the data of the storage means until the completion of the storage means characterization process. Alternatively, the data reproduction system can already start using the storage means and take the necessary actions in order to reproduce the data of the storage means while the device characterization process is carried out. If it is determined, that the determined read latency is not sufficient and hence the storage means is rejected, the reproduction of the data will then be stopped. The former approach allows maximum reliability at the expense of a longer delay before the actual playback of the audio files can begin. The latter approach allows a shorter delay at the risk of starting playback from a storage device that cannot be reliably used.

In a preferred embodiment of the present invention a maximum read time is predetermined. Once the read latency of the storage means is determined, it is compared with the maximum read time. If the value of the read latency lies above the maximum read time, the storage means is rejected. On the other hand if it is equal to or lies below maximum read time, the storage means is admitted to the peripheral bus. The predetermined maximum read time is of such a nature that as long as the predetermined read latency equals the maximum read time or lies below this value the reliable and flawless operability is always ensured.

Preferably the data reproduction system comprises a buffer for transferring data and the maximum read time is predetermined based on the total buffer size available for transferring data from the storage means to the data reproduction system. The greater the total available buffer size is, the greater is the value of the maximum read time.

According to another preferred embodiment the data reproduction system, upon rejection of the storage means, adjusts its resource allocation. The adjustment of the resource allocation is carried out in such a way that the maximum read time at least equals the read latency and therefore, the storage means can be admitted to the peripheral bus. Based on the measured read latency, the data reproduction system can determine the amount of buffering needed to reliably stream the compressed data from the storage means to the system. In case the required amount of memory is larger than the available memory, which would usually lead to the rejection of the storage means, the data reproduction system can temporarily disable memory intensive features (for example decoding a second file for another user or the like) to allow the storage means to be reliably used. Also, the read-sizes and timing can be adjusted by the system in order to suit the characteristics of the storage means.

According to another preferred embodiment, upon the admission of the storage means, the read latency of the storage means is determined during the data reproduction process randomly or alternatively, in predetermined intervals. Each time the read latency is determined, it is subsequently compared with the maximum read time. If the read latency value during the data reproduction process exceeds the maximum read time, the data reproduction system takes the necessary actions, that is rejecting the storage means and thus discontinuing the data reproduction process, adjusting the resource allocation in order to increase the maximum read time, and/or notifying the user. With this embodiment the likelihood that the data reproduction process is flawed is further abated.

According to another preferred embodiment the data reproduction system comprises a display means for confirming or notifying the user when a storage means has been rejected and/or has been admitted. This embodiment allows giving feedback to the user with regard to the device characterization process. Further, additional features such as maximum and/or minimum bitrate that are supported by the data reproduction system can be displayed to the user.

According to yet another preferred embodiment the data reproduction system stores the determined read latency values and assigns the stored values to the respective storage means. Therefore, the data reproduction system can keep a history of optimal settings for each analyzed storage device in its permanent storage. The optimal settings can be matched to the device upon insertion, for example based on the device serial number, the manufacturer ID, or the device ID.

Another preferred embodiment of the invention uses another method to calculate the read latency and is based on random reads. The read locations have to be from locations that are spaced far enough apart to prevent influences to the measurement by internal buffering of the device. This can speed up the characterization process.

The underlying problems of the present invention will further be solved by a data reproduction system for reproduction of data received from a storage means wherein the data reproduction system comprises a control means for controlling the transfer of data within the system and the reproduction of data, a buffer for transferring data, a peripheral bus connecting a storage means to the data reproduction system, and an admission control means for controlling the admission of the storage means to the peripheral bus based on the read latency of the storage means, wherein said admission control means is adapted to determine the read latency of the storage means.

According to a preferred embodiment of the system, the system comprises a timer for measuring the read latency.

According to yet another preferred embodiment of the system, the peripheral bus is a universal serial bus.

One possible field of application of the invention lies in the automotive industry. In this field more and more data reproduction systems, such as audio and video entertainment systems, navigation and car-infotainment systems, are employed. Other application areas can be devices such as a TV, a settop-box, a portable media player, a mobile phone or the like, which usually have memory resource optimization issues and to which external storage means can be added.

BRIEF DESCRIPTION OF THE DRAWINGS

The above other features and advantages of the invention will be apparent from the following description of an exemplary embodiment of the invention with reference to the accompanying drawings, in which.

DESCRIPTION OF EMBODIMENTS

Figure 1:
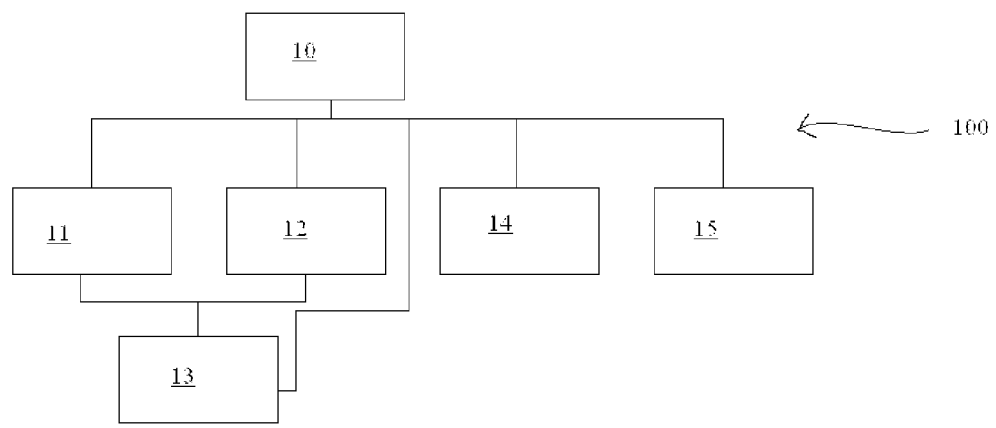
FIG. 1 shows schematicly the architecture of a data reproduction system.

FIG. 1 shows a block diagram of the main components of a data reproduction system 100 in form of a car audio replay system. The data reproduction system 100 comprises a controller 10 for controlling the transfer of data within the system and the reproduction of data. The controller 10 is the controlling component that initializes and connects the underlying components to perform the function of compressed audio playback from a connected USB mass storage class device. Reference sign 11 indicates a USB driver component that takes care of detecting, mounting, and accessing the connected USB mass storage class device. The system 100 further comprises a file buffer 12, which buffers incoming data in order for the system to be able to handle the access characteristics of the connected devices. It is characterized by a total buffer size and a read size. Component 13 constitutes an admission control means for controlling the admission of the USB mass storage class device to the system 100. A decoder component 14 is responsible for decoding the compressed audio data received from the USB mass storage class device to audio samples. The reference sign 15 constitutes an audio output component, such as speakers or the like.

Figure 2:
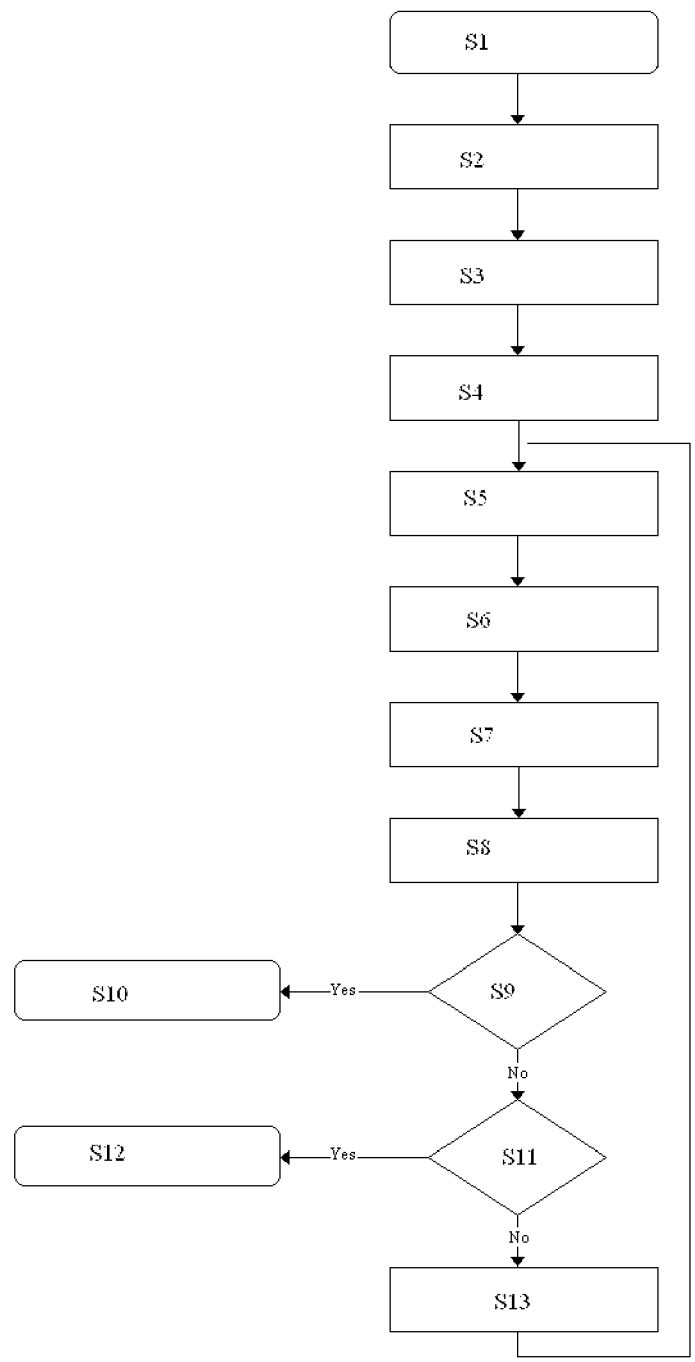
FIG. 2 shows a flow chart of an algorithm that is carried out in order to control the admission of a storage means to the data reproduction system of FIG. 1.

FIG. 2 depicts a flow chart of a device characterization algorithm with which the admission of a storage means to the data reproduction system can be controlled. The shown algorithm is used with the car audio playback system 100. The described embodiment determines the read latency by using the same access behaviour on a single file as during audio playback. Therefore, the system will measure the latency characteristics of the storage device in a situation that resembles the actual use.

In step 1 the USB mass storage class device is inserted and mounted into the car audio replay system. Upon mounting of the storage device, the controller of the system starts the device characterization process. In step 2 the characteristics of the file buffer component of the audio replay system are established. The characteristics of the file buffer include "total-buffer-size" (in byte) and "read-size" (in byte).

In step 3 the "read time" is calculated as quotient of "total-buffer-size" and the "characterization-bitrate". The "characterization-bitrate" is the typical bitrate of the compressed audio files and is fed to the system as a predetermined parameter. To enhance the reliability the algorithm could be started multiple times with typical, minimal and maximal bitrates as the characterization bitrate.

In step 4 a file on the storage device is opened. Preferably the file is an audio file. In step 5 a timer is started for measuring the read latency. Step 6 comprises reading "read-size" bytes from the storage device. In step 7 the timer is stopped when the read completes and the read latency is calculated as the difference between the start value of the timer and the current value of the timer. Step 8 comprises updating the value "maximum latency" if the new measured read latency is larger than the previous "maximum latency".

In step 9 the "maximum latency" is compared with the "read time". If the latency is greater than the read time then the device will be rejected in step 10 because it cannot be supported reliably. Additionally, a corresponding message can be displayed to the user. If the result of step 9 is that the read latency is equal to or less than the read-time then in step 11 it is determined whether sufficient measurements have been done. The moment when sufficient measurements are gathered can be a fixed predetermined number of measurements or can be calculated based on maximum allowed characterization algorithm duration. If it is determined that sufficient measurements have been done then the device will be admitted to the peripheral bus of the audio replay system in step 12 and additionally, a corresponding message can be displayed to a user. If, on the other hand, in step 11 it is determined that sufficient measurements have not been conducted yet, then in step 13 it will be waited an amount of time that can be calculated as "read-size" divided by the "characterization-bitrate" in order to ensure proper read access characteristics and then steps 5 to 12 will be reiterated.

It should be mentioned that the described embodiment in FIG. 2 uses an exemplary model for the access behaviour of the compressed audio playback device. In any implementation, however, the model or algorithm respectively should be as close as possible to the actual behaviour of the file buffer component, which is determined by its implementation and buffering strategy. This includes in particular other ways of determining the amount of time to wait in step 13, including models or algorithms where this time is variable in different reiterations.

References
100 Data reproduction system
10 Controller
11 USB driver component
12 File buffer
13 Admission control means
14 Decoder
15 Audio output means

The invention claimed is:

1. A method for controlling the admission of a storage device to a peripheral bus of a data reproduction system, comprising the steps of:
   connecting the storage device to the peripheral bus of the data reproduction system,
   determining the read latency of the storage device, and
   deciding based on the determined read latency whether the storage device is admitted to the peripheral bus or rejected, including comparing the determined read latency with a predetermined maximum read time.

2. The method of claim 1, wherein the data reproduction system comprises a buffer for transferring data and wherein the maximum read time is determined based on a total buffer size available for transferring data from the storage device to the data reproduction system.

3. The method of claim 1, wherein the data reproduction system upon rejection of the storage device increases the maximum read time in such a way that it at least equals the read latency by adjusting its resource allocation.

4. The method of claim 1, wherein the data reproduction system comprises a display for confirming to a user when the storage device has been rejected and/or has been admitted.

5. The method of 4, wherein the display displays the maximum and/or minimum bit rates that are supported by the data reproduction system.

6. The method of claim 1, wherein the data reproduction system stores the determined read latency values and assigns the stored values to the respective storage device.

7. The method of claim 1, wherein the data reproduction system is further configured and arranged to maintain a history of optimal settings for each analyzed storage device.

8. The method of claim 1, further including the step of reproducing the data of the storage device after the step of deciding whether the storage device is admitted to the peripheral bus.

9. The method of claim 1, further including a step of determining buffering needed to stream compressed data from the storage device to the data reproduction system.

10. A method for controlling the admission of a storage device to a peripheral bus of a data reproduction system, comprising the steps of:
   connecting the storage device to the peripheral bus of the data reproduction system,
   determining the read latency of the storage device, and
   deciding based on the determined read latency whether the storage device is admitted to the peripheral bus or rejected, wherein upon admission of the storage device the read latency of the storage device is determined during a data reproduction process randomly or in predetermined intervals and compared with the maximum read time.

11. A data reproduction system for reproduction of data received from a storage device, comprising:
   a controller for controlling the transfer of data within the system and the reproduction of data,
   a buffer for transferring data, and
   a peripheral bus for connecting a storage device to the data reproduction system, characterized in that the data reproduction system further comprises an admission controller for controlling the admission of a storage device to the peripheral bus based on the read latency of the storage device, wherein said admission controller is adapted to determine the read latency of the storage device; and wherein the controller is further configured and arranged to reproduce the data of the storage device concurrently with the admission controller controlling admission of the storage device.

12. The system of claim 11, wherein the system further comprises a timer for measuring the read latency.

13. The system of claim 11, wherein the peripheral bus is a universal serial bus.

14. The system of claim 11, wherein the data reproduction system is further configured and arranged to maintain a history of optimal settings for each analyzed storage device.

15. The system of claim 11, wherein the controller is further configured and arranged to reproduce the data of the storage device after admission of the storage device.

16. The system of claim 11, wherein the buffer is further configured and arranged to determine buffering needed to stream compressed data from the storage device to the data reproduction system.

17. A method for controlling the admission of a storage device to a peripheral bus of a data reproduction system comprising the steps of:

connecting the storage device to the peripheral bus of the data reproduction system, determining the read latency of the storage device, deciding based on the determined read latency whether the storage device is admitted to the peripheral bus or rejected, and reproducing the data of the storage device, performed concurrently with the step of deciding whether the storage device is admitted to the peripheral bus, wherein the step of reproducing the data is stopped if the storage device is rejected.

18. A system for controlling admission of a storage device to a peripheral bus of a data reproduction system, comprising a controller configured and arranged to:

begin reproducing data stored on the storage device in response to the storage device being connected to the peripheral bus;

during the reproducing of the data stored on the storage device:

determine a read latency of the storage device;

determine a maximum read time based on an amount of memory available for buffing data transferred from the storage device to the data reproduction system;

decide whether the storage device is admitted to the peripheral bus or rejected based on a comparison between the determined read latency and the determined maximum read time; and in response to deciding not to admit the storage device to the peripheral bus, stop the reproducing of the data; and maintain a history of optimal settings for the connected storage device.

* * * * *